United States Patent
Bhaskar et al.

(10) Patent No.: US 8,364,614 B2
(45) Date of Patent: Jan. 29, 2013

(54) METHOD FOR BUILDING PREDICTIVE MODELS WITH INCOMPLETE DATA

(75) Inventors: Tarun Bhaskar, Bangalore (IN); Ramasubramanian Gangaikondan Sundararajan, Bangalore (IN)

(73) Assignee: General Electric Company, Niskayuna, NY (US)

( * ) Notice: Subject to any disclaimer, the term of this patent is extended or adjusted under 35 U.S.C. 154(b) by 1109 days.

(21) Appl. No.: 11/971,094

(22) Filed: Jan. 8, 2008

(65) Prior Publication Data
US 2009/0177598 A1 Jul. 9, 2009

(51) Int. Cl.
*G06F 15/18* (2006.01)
(52) U.S. Cl. .............................. 706/13; 706/48; 707/691
(58) Field of Classification Search ................. 706/48, 706/13
See application file for complete search history.

(56) References Cited

U.S. PATENT DOCUMENTS

| | | | |
|---|---|---|---|
| 6,954,758 B1 | 10/2005 | O'Flaherty | |
| 7,043,461 B2 | 5/2006 | Kedher et al. | |
| 2002/0188424 A1* | 12/2002 | Grinstein et al. | 702/183 |
| 2005/0159996 A1 | 7/2005 | Lazarus et al. | |
| 2006/0004523 A1* | 1/2006 | Minor | 702/19 |
| 2009/0192855 A1* | 7/2009 | Subramanian et al. | 705/7 |

OTHER PUBLICATIONS

C. A. Murthy, Nirmalya Chowdhury, In search of optimal clusters using genetic algorithms, Pattern Recognition Letters, vol. 17, Issue 8, Jul. 1, 1996, pp. 825-832.*

A. P. Dempster, N. M. Laird and D. B. Rubin. Maximum Likelihood from Incomplete Data via the EM Algorithm. Journal of the Royal Statistical Society. Series B (Methodological). vol. 39, No. 1 (1977), pp. 1-38.*

Lessmann, S.; Stahlbock, R.; Crone, S.F.; , "Genetic Algorithms for Support Vector Machine Model Selection," Neural Networks, 2006. IJCNN '06. International Joint Conference on, pp. 3063-3069.*

C.-Y. Tsai, C.-C. Chiu, A purchase-based market segmentation methodology, Expert Systems with Applications, vol. 27, Issue 2, Aug. 2004, pp. 265-276.*

Shichao Zhang, Yongsong Qin, Xiaofeng Zhu, Jilian Zhang, and Chengqi Zhang. 2006. Optimized parameters for missing data imputation. In Proceedings of the 9th Pacific Rim international conference on Artificial intelligence (PRICAI'06), Qiang Yang and Geoff Webb (Eds.). Springer-Verlag, Berlin, Heidelberg, 1010-1016.*

Eduardo R. Hruschka, Estevam R. Hruschka and Nelson F. F. Ebecken. Missing Values Imputation for a Clustering Genetic Algorithm. Advances in Natural Computation Lecture Notes in Computer Science, 2005, vol. 3612/2005, 433-434.*

Donald B. Rubin, "The Bayesian Bootstrap", The Annals of Statistics 1981, vol. 9, No. 1, pp. 130-134.

(Continued)

*Primary Examiner* — Alan Chen
*Assistant Examiner* — David H Kim
(74) *Attorney, Agent, or Firm* — Fletcher Yoder, P.C.

(57) ABSTRACT

A method that imputes missing values while building a predictive model. A population of solutions is created using a data set comprising missing values, wherein each solution comprises parameters of each of the predictive models and the missing values of a data set. Each of the solutions in a population is checked for fitness. After the fitness is checked, the solutions in a population are genetically evolved to establish a successive population of solutions. The process of evolving and checking fitness is continued until a stopping criterion is reached.

20 Claims, 4 Drawing Sheets

| CUSTOMER | X1 | X2 | X3 | X4 | ..... | Xn | Y |
|---|---|---|---|---|---|---|---|
| 1 | $X_{1,1}$ | $X_{m2,1}$ | $X_{3,1}$ | $X_{4,1}$ | ..... | $X_{n,1}$ | 0 |
| 2 | $X_{m1,2}$ | $X_{2,2}$ | $X_{3,3}$ | $X_{4,4}$ | ..... | $X_{n,2}$ | 1 |
| 3 | $X_{1,3}$ | $X_{2,3}$ | $X_{3,3}$ | $X_{4,3}$ | ..... | $X_{n,3}$ | 0 |
| 100 | $X_{1,100}$ | $X_{2,100}$ | $X_{3,100}$ | $X_{4,100}$ | ..... | $X_{n,100}$ | 1 |
| 101 | $X_{1,101}$ | $X_{2,101}$ | $X_{m3,101}$ | $X_{4,101}$ | ..... | $X_{n,101}$ | 0 |
| 190 | $X_{1,190}$ | $X_{2,190}$ | $X_{3,190}$ | $X_{4,190}$ | ..... | $X_{n,190}$ | 1 |
| 191 | $X_{1,191}$ | $X_{m2,191}$ | $X_{3,191}$ | $X_{4,191}$ | ..... | $X_{n,191}$ | 0 |
| 500 | $X_{1,500}$ | $X_{2,500}$ | $X_{3,500}$ | $X_{4,500}$ | ..... | $X_{n,500}$ | 1 |
| 501 | $X_{1,501}$ | $X_{2,501}$ | $X_{3,501}$ | $X_{m4,501}$ | ..... | $X_{n,501}$ | 0 |
| k | $X_{1,n}$ | $X_{2,n}$ | $X_{3,n}$ | $X_{4,n}$ | ..... | $X_{n,k}$ | 0 |

OTHER PUBLICATIONS

Paul R. Rosenbaum et al., "The Central Role of the Propensity Score in Observational Studies for Causal Effects", Biometrika, vol. 70, No. 1, 1983, pp. 41-55.

K. Lakshminarayan et al., "Imputation of Missing Data in Industrial Databases," Applied Intelligence, vol. 11, pp. 259-275, 1999.

M. S. Krishnan et al., "Customer Satisfaction for Financial Services: The Role of Products, Services and Information Technology", 1998, pp. 1-41.

S. F. Buck, "A Method of Estimation of Missing Values in Multivariate Data suitable for use with an Electronic Computer," Journal of the Royal Statistical Society, vol. 22, No. 2, 1960, pp. 302-306.

M. Huisman, "Imputation of Missing Item Responses: Some Simple Techniques," Quality and Quantity, vol. 34, pp. 331-351, 2000.

I. G. Sande, "Hot-Deck imputation Procedures," Incomplete Data in Sample Surveys, vol. 3, Session 8, Academic Press Inc., pp. 339-349, 1983.

* cited by examiner

| CUSTOMER | CUSTOMER DATA | | | | | | Y |
|---|---|---|---|---|---|---|---|
| | X1 | X2 | X3 | X4 | ····· | Xn | |
| 1 | $X_{1,1}$ | $X_{m2,1}$ | $X_{3,1}$ | $X_{4,1}$ | ····· | $X_{n,1}$ | 0 |
| 2 | $X_{m1,2}$ | $X_{2,2}$ | $X_{3,3}$ | $X_{4,4}$ | ····· | $X_{n,2}$ | 1 |
| 3 | $X_{1,3}$ | $X_{2,3}$ | $X_{3,3}$ | $X_{4,3}$ | ····· | $X_{n,3}$ | 0 |
| ⋮ | | | | | | | |
| 100 | $X_{1,100}$ | $X_{2,100}$ | $X_{3,100}$ | $X_{4,100}$ | ····· | $X_{n,100}$ | 1 |
| 101 | $X_{1,101}$ | $X_{2,101}$ | $X_{m3,101}$ | $X_{4,101}$ | ····· | $X_{n,101}$ | 0 |
| ⋮ | | | | | | | |
| 190 | $X_{1,190}$ | $X_{2,190}$ | $X_{3,190}$ | $X_{4,190}$ | ····· | $X_{n,190}$ | 1 |
| 191 | $X_{1,191}$ | $X_{m2,191}$ | $X_{3,191}$ | $X_{4,191}$ | ····· | $X_{n,191}$ | 0 |
| ⋮ | | | | | | | |
| 500 | $X_{1,500}$ | $X_{2,500}$ | $X_{3,500}$ | $X_{4,500}$ | ····· | $X_{n,500}$ | 1 |
| 501 | $X_{1,501}$ | $X_{2,501}$ | $X_{3,501}$ | $X_{m4,501}$ | ····· | $X_{n,501}$ | 0 |
| ⋮ | | | | | | | |
| k | $X_{1,n}$ | $X_{2,n}$ | $X_{3,n}$ | $X_{4,n}$ | ····· | $X_{n,k}$ | 0 |

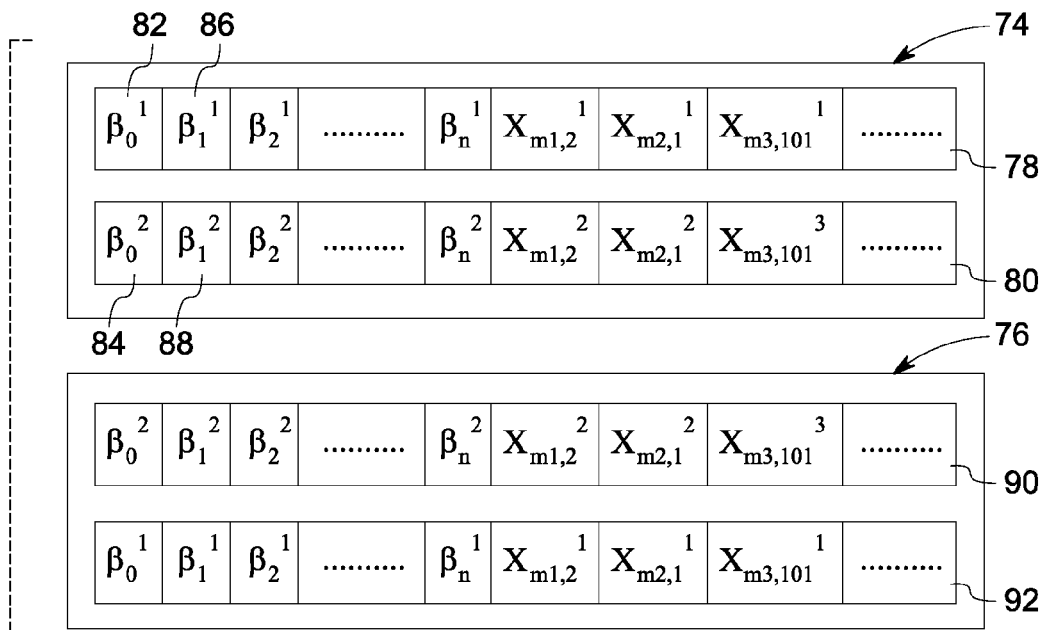
FIG. 6
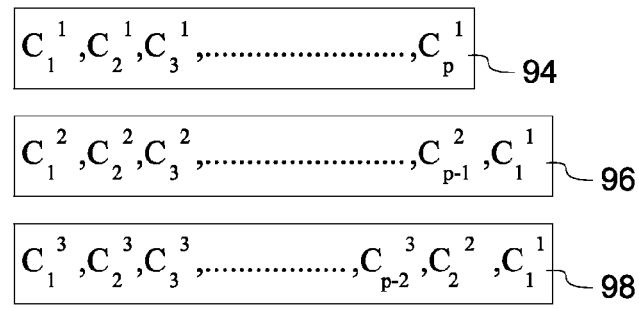
FIG. 7
$$L(X,\beta) = \prod_{i=1}^{k} \left(\frac{1}{1+e^{-f(X_i)}}\right)^{y_i} \times \left(\frac{e^{-f(X_i)}}{1+e^{-f(X_i)}}\right)^{(1-y_i)}$$
$y_i \in \{0,1\}$
$f(X_i) = \beta_0 + \beta_1 \cdot X_{1,i} + \beta_2 \cdot X_{2,i} + \ldots + \beta_n \cdot X_{n,i}$
FIG. 8

METHOD FOR BUILDING PREDICTIVE MODELS WITH INCOMPLETE DATA

BACKGROUND

The invention relates generally to a process of creating predictive models and, more particularly, to a method of creating predictive models with incomplete data using genetic algorithms. The invention may be employed, for example, to create propensity models.

Customer relationship management (CRM) has become the key to growth in today's highly competitive market. Information about customers' interests and their earning and spending behavior is useful for companies to identify which section of the market they are catering to. Such information also helps the companies to predict the relevant aspects of a customer's behavior, for example, how likely the customer is to respond to an offer, how much the customer is likely to borrow etc. Companies therefore maintain databases of their customers replete with such information and conduct surveys and create customer response sheets to gather data in a database to build predictive models.

The method of obtaining data from the customers plays a major role in deciding the level of completeness of the data set. For example, a data set obtained from the details given by customers that are necessary pre-requisites to opening an account will typically be complete. But a data set obtained from data provided on other bases, such as human resource profiling sheets completed by customers may be incomplete because the information is not mandatory. Finally, data sets most susceptible to gaps and faults will typically be those obtained by conducting surveys amongst customers because nothing is mandatory in such surveys.

However, the only basis for conducting needed market analysis is data. The quality of the data used will generally be reflected in the quality of the resulting analysis. Therefore, to conduct a comprehensive analysis, it is indispensable that data sets be used that are complete as possible. Omission of any customer from the analysis could simply translate to loss of valuable business and/or loss of accuracy in the resulting analysis.

A typical customer database may be presented as a table of rows and columns where each row corresponds to a customer while the columns correspond to different information about the customer, such as account level information provided by the company, personal information provided by the customer, or a behavior or bureau score provided by a credit scoring agency. The table may contain blank cells where data is missing. It is generally desirable to complete otherwise compensate for the missing data. The problem is essentially to impute some value in these blank cells so as to provide the maximum amount of information in the database and thereby to enable a good predictive model to be built from that information.

Missing values can be imputed using methods such as mean imputation, hot deck imputation, cold deck imputation, regression analysis, propensity score analysis and multiple imputation. Mean imputation, hot deck imputation and cold deck imputation are relatively naïve and inappropriate to be used profitably in a large data sheet. Regression analysis also typically provides extremely inaccurate results if the data do not follow a linear model, especially in large data sheets. This also rules out predictive mean matching for large data sets. Propensity score analysis too is generally inaccurate for large data sets. Multiple imputation is a rigorous process which involves finding multiple estimates for each missing value from several samples of complete data and then combining all these estimates to get the final value to be imputed. However, in many cases, multiple imputation may necessitate too much overhead, investment and computation cost to justify its use for missing value problems.

The problem of missing value imputation is a small part of the entire process of predictive modeling, but the quality of the model is dependent on the information used to build the model. Therefore, there is a need for a method capable of providing good imputation for the missing values and yet does not require a separate and exhaustive process.

BRIEF DESCRIPTION

The present invention proposes a method that imputes a value for each blank cell representing a missing value in a database while building a predictive model, eliminating the need for separate process to impute the missing values.

A population of predictive models is created using a data set comprising missing values by encoding parameters of each of the predictive models and the missing values of a data set. Each of the predictive models in a population is checked for fitness using a fitness function. After the fitness is checked, the predictive models in a population are genetically evolved to establish a successive population of predictive models. The process of evolving and checking fitness is continued until a predictive model having a predetermined fitness in a population is identified.

DRAWINGS

These and other features, aspects, and advantages of the present invention will become better understood when the following detailed description is read with reference to the accompanying drawings in which like characters represent like parts throughout the drawings, wherein:

FIG. 6 is an embodiment of a pair of solutions undergoing cross-over, in accordance with an exemplary embodiment of the present technique;

FIG. 7 is an embodiment of a process of elitism, in accordance with an exemplary embodiment of the present technique;

FIG. 8 is an embodiment of a fitness function, in accordance with an exemplary embodiment of the present technique;

DETAILED DESCRIPTION

The present invention proposes a method to build predictive models using a data set with missing values. Predictive models can be defined as models that map a relationship between a set of inputs and an output. This relationship may be unknown, and therefore inferred from available data. One way of classifying the various types of predictive models is through the nature of the output variable. The output can be of many types, such as categorical and real-valued. Two-class classification and regression are two examples of classification of predictive models based on the nature of the output variables.

In two-class classification, the output variable falls into one of two classes $\{0, 1\}$. The predictive model uses past data, where both the inputs and the output are known, to arrive at a function that predicts the likelihood that the output will be equal "1" for an unseen example, i.e., where the inputs are known but the output is unknown. A function, "f", which maps the inputs, "X's", to the output, "y" can be represented as:

$$f(X) = \beta_0 + \beta_1 \cdot X_1 + \beta_2 \cdot X_2 + \ldots + \beta_n \cdot X_n \quad (1)$$

In the above equation, the higher the value of f(X) the greater the likelihood that the output, "y" will be equal to "1". Propensity models are a typical example of this case and will be discussed in detail.

In regression, the output variable is a real value. In this case, the predictive model uses past data to arrive at a function "f" that predicts the output for an unseen example. A function, "g", which maps the inputs, "X's", to the output, "y" can be represented in this case as:

$$g(X) = \beta_0 + \beta_1 \cdot X_1 + \beta_2 \cdot X_2 + \ldots + \beta_n \cdot X_n \quad (2)$$

In the above equation, g(X) is the predicted value of the output variable, "y". An example of this kind of problem is where a bank would like to predict the profit it would make from its credit card customers over the next year, based on the existing data of customers behavior.

The present invention will now be described as it might be applied in conjunction with an exemplary technique for predicting the propensity of a particular event to occur using data having missing values. For example, the technique enables prediction of the propensity of a customer to accept a loan offer made by a bank.

Figure 1:
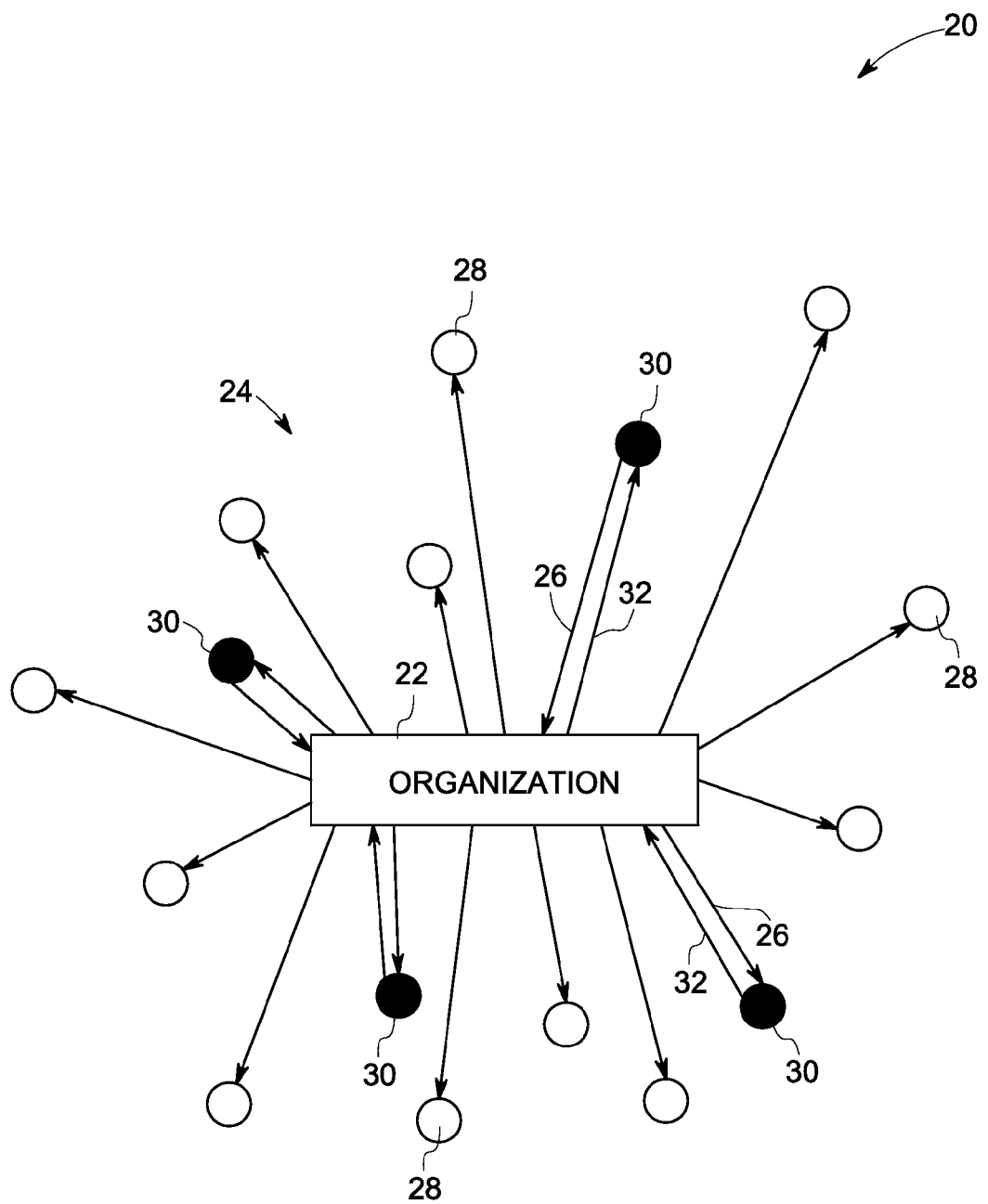
FIG. 1 is a schematic representation of a system for engaging customers/clients/partners, in accordance with an exemplary embodiment of the present technique.

Referring now to FIG. 1, the present invention will be described as it might be applied in conjunction with an exemplary technique for predicting the propensity of a particular event to occur, as represented generally by reference numeral 20. For example, the technique enables the propensity of a customer to accept a commercial offer made by a business to be predicted. In the illustrated embodiment, an organization 22 has a large number of potential customers, represented generally by reference numeral 24. The organization may be any type organization that engages in transactions with an outside organization or entity. In this embodiment, the organization 22 in the past has made an offer 26 to each of its customers 24. A large number of customers 24, represented generally by reference numeral 28, rejected the offer 26 in the past. Therefore, the rate of this event occurring, a customer rejecting the offer, is very high. However, a small number of customers, represented generally by reference numeral 30, have replied to an offer 26 with an acceptance 32 of the offer 26. Thus, the rate for this event, a customer accepting the offer, is low. From these past experiences, a propensity model may be developed to predict the propensity of a given customer, or type of customer to accept an offer in the future.

Figures 2, 3:
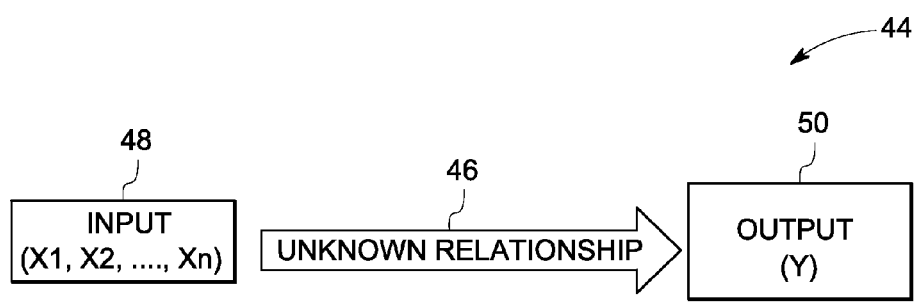
FIG. 2 is a representation of a database comprising partial customer data acquired from or about the customers, in accordance with an exemplary embodiment of the present technique.
FIG. 3 is a is a schematic diagram of the basis for a technique for developing a predictive model of an event, in accordance with an exemplary embodiment of the present technique.

Referring generally to FIG. 2, the technique utilizes a database of data regarding past offers made to the customers (along with any other data that may affect propensities of the customers), represented generally by reference numeral 34, to develop a model of the propensity of a customer or type of customer to accept an offer made in the future (or more generally, to take any action of interest). In the illustrated embodiment, the database 34 comprises a list of customers 36 and data 38 representative of or relating to the customer. Each row of the database corresponds to a specific customer and each column corresponds to a different element of the customer data 38. The customer data 38 may be information which the company has obtained from previous transactions with the customer, or information obtained from a third party, such as a credit scoring agency.

The customer data 38 includes customer characteristic data, represented generally by reference numeral 40. In this embodiment, each customer characteristic, "X", has its own column in the database 34 and the database is adapted to store a plurality of different customer characteristics, "$X_1$ to $X_n$". The customer characteristics may include, for example, the age of the customer, the annual income of the customer, the geographic location of the customer, the area of employment of the customer, and so forth.

In the illustrated embodiment, each customer characteristic 40 is stored in a data box 42. For example, a data box 42 is used to store the value of a first customer characteristic, "$X_1$", of a first customer, "1". The value corresponding to the first characteristic, "$X_1$", of the first customer, "1", is represented in the data box 44 as "$X_{1,1}$". The first "1" in the subscript corresponds to the first customer characteristic and the second "1" in the subscript corresponds to the first customer. As noted above, the first characteristic, "$X_1$", may be the customer's age, the customer's annual income, etc. Similarly, a data box 42 is used to store the value of a second customer characteristic, "$X_2$", of the first customer, "1". The value corresponding to the second characteristic, "$X_2$", of the first customer, "1" is represented in the data box 42 as "$X_{2,1}$". The "2" in the subscript corresponds to the second customer characteristic and the "1" in the subscript corresponds to the first customer.

The customer data can be incomplete with missing values of the customer characteristics that cannot be obtained. This is typical in a customer database. The missing values are represented using "m" as the subscript. For example, a missing value corresponding to the first characteristic, "$X_1$", of the second customer, "2", is represented in the data box 42 as "$X_{m1,2}$".

Referring generally to FIG. 3 a schematic diagram of the basis for developing a propensity model (predictive model in general) is presented, and represented generally by reference numeral 44. The development of the propensity model is based on approximating an unknown relationship 46 between various inputs 48 and outputs 50. In this example, the inputs 48 are the various customer characteristics and the outputs 50 are the customer's propensity to accept an offer, represented as "y", which is in a binary form. Once the unknown relationship 46 is established, a model of the propensity of an event to occur in the future may be established. Propensity modeling tries to find a relationship between the "X's", as shown in FIG. 1, and the "y", i.e., a relationship between the customer characteristics and the customer's propensity. More specifically, the objective is to find a function, "f", which most accurately maps the "X's" to the "y". The resulting function, "f", is the propensity model. For these purposes, it is assumed that the function, "f", is a linear function of "X". However, the function, "f", can be of any form, such as non-linear, as long as it is possible to relate the value of f(X) to the likelihood of "y" taking the value "1". For instance, the propensity model for "n" customer characteristics can be represented as:

$$f(X) = \beta_0 + \beta_1 \cdot X_1 + \beta_2 \cdot X_2 + \ldots + \beta_n \cdot X_n, \ y \in \{0,1\} \quad (3)$$

The objective of propensity modeling is to find an optimal set of "β's" so that the function, "f", gives a "good" map of the relationship between the "X's" and the "y", i.e., the relationship between the customer characteristics and the customer's propensity. The propensity modeling becomes inaccurate when there are missing values for the customer characteristics. The objective is to impute missing values while estimating the values of "β's".

The propensity models utilized in this embodiment are linear functions of the customer characteristics, although other functions and types of functions may be employed. In a presently contemplated embodiment, the initial values for the "β's" and the missing values of unobtainable customer characteristics used in the function are selected at random. It should be noted, however, that other techniques for selecting initial values may also be used. Initially, a first population of solutions is established. Each solution comprises parameters of a propensity model and the missing values in the dataset. The solutions are processed by the various processors using genetic algorithms to evolve the initial solutions into a successive population of better solutions. The genetic algorithms utilize techniques that mimic evolution to change the "β's" and missing values For example, the genetic algorithms may initiate random mutations in the values for the "β's" and the missing values in the models or the genetic algorithm may initiate crossovers of "β's" and crossovers of the missing values between solutions, as occurs in nature during meiosis in eukaryotic cells. Each change in a population of the solutions represents a generation of the solutions. Genetic algorithms may also initiate a process called elitism, where the best-fit solutions are maintained across generations. The above three genetic algorithm techniques, cross-over, mutation and the elitism can be used in conjunction with one another.

In this embodiment, the quality of each of the solutions is measured using a fitness function. One embodiment of the fitness function is presented in FIG. 8. In this embodiment, the higher the values of L, the higher the fitness of the model. The genetic algorithms are used to continue evolving the solutions until a stopping criterion is reached.

Figure 4:
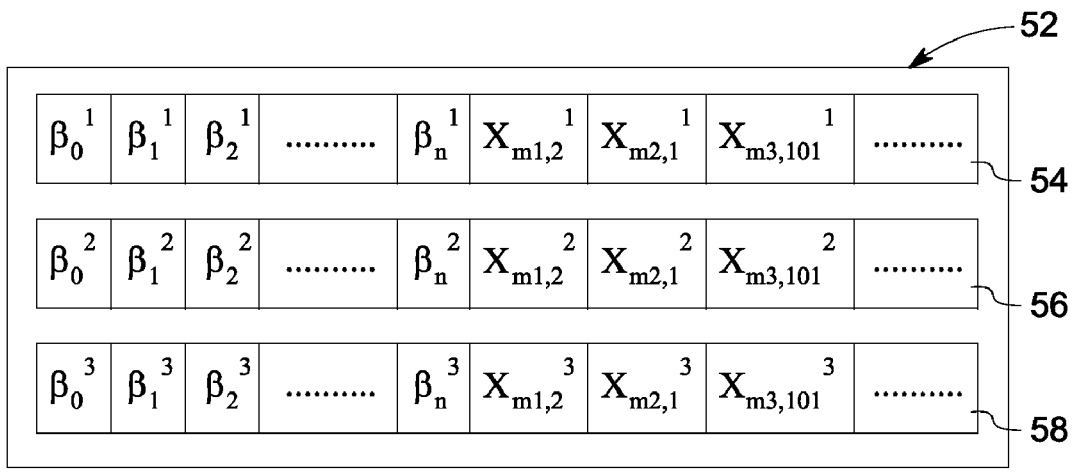
FIG. 4 is an embodiment of an initial set of solutions, in accordance with an exemplary embodiment of the present technique.

Referring generally to FIG. 4, an embodiment of solutions of the initial population is presented, and represented generally by reference numeral 52. The initial population comprises a finite number of randomly chosen solutions. In this embodiment, a first solution 54, a second solution 56, and a third solution 58 are presented, but a greater or lesser number of solution may be used. The first solution 54 comprising strings of encoded "β's" and encoded missing values represents a first propensity model with imputed missing values. The superscripts of the various β variables and the missing values indicate the solution to which they belong, first, second, third, etc. For example, the superscript "1" corresponds to the first solution 54. Similarly, the superscripts "2" and "3" correspond to the second value 56 and the third solution 58, respectively.

Figure 5:
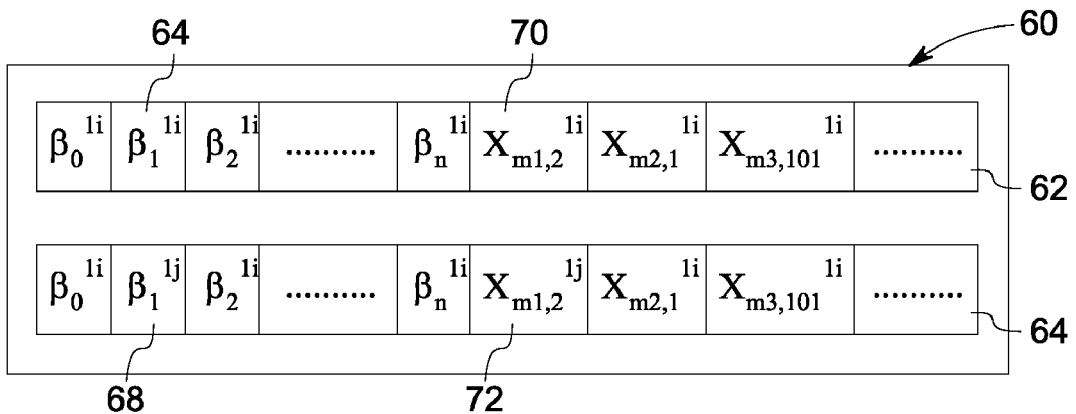
FIG. 5 is an embodiment of a solution experiencing mutation, in accordance with an exemplary embodiment of the present technique.

Referring generally to FIG. 5, an embodiment of the process of mutation in a propensity model is presented. In FIG. 4, a solution before mutation and a solution after mutation are presented, and represented generally by reference numeral 60. In this embodiment, a first solution 62 undergoes mutation to a second solution 64. More specifically, in the illustrated embodiment, the value for $\beta_1^1$ in the first solution 62 mutates from an initial value, $\beta_1^{1i}$, represented generally by reference numeral 66, to a mutated value, $\beta_1^{1j}$, represented generally by reference numeral 68, in the second solution 64. Similarly, the value for $X_{m1,2}^1$ in the first solution 62 mutates from an initial value, $X_{m1,2}^{1i}$, represented generally by reference numeral 70, to a mutated value, $X_{m1,2}^{1j}$, represented generally by reference numeral 72, in the second solution 50.

In general, a cross-over is an operation that produces a changed model (or following the genetic analogy, "an offspring") that is derived from the characteristics of earlier models (or "parents"). For instance, one could take two solutions, pick a particular variable and produce a third solution whose value of that variable is the average of the values of that variable in the two solutions considered. These two solutions are chosen on the basis of their fitness. For instance, a mechanism can be used where the two solutions are picked at random from the population such that the probability of a solution being chosen is proportional to its fitness. Referring generally to FIG. 6, an embodiment of the process of cross-over between solutions is presented. A pair of solutions before crossover, represented generally by reference numeral 74, and the same pair of solutions after crossover, represented generally by reference numeral 76, are presented. During crossover, the values for one or more β variables from one solution are swapped with the values for one or more β variables of another solutions. In the illustrated embodiment, the $\beta_0$ and $\beta_1$ values in a first solution 78 are swapped with the $\beta_0$ and $\beta_1$ values of a second solution 80. Specifically, $\beta_0^1$, represented generally by reference numeral 82, of the first solution 78 is swapped with $\beta_0^2$, represented generally by reference numeral 84, of the second solution 80. Specifically, $\beta_1^1$, represented generally by reference numeral 86, of the first solution 78 is swapped with $\beta_1^2$, represented generally by reference numeral 88, of the second solution 80. Consequently, the first solution in the next generation, represented generally by reference numeral 90, and the second solution in the next generation, represented generally by reference numeral 92, have new values for $\beta_1$.

Similarly, all the missing values ($X_{m1,2}$, $X_{m2,1}$, $X_{m3,101}$, ...) in a first value 78 are swapped with the $X_{m2}$ value of a second solution 80. Consequently, the first solution in the next generation, represented generally by reference numeral 90, and the second solution in the next generation, represented generally by reference numeral 92, have new values for the missing values.

In the above embodiment, the process of crossover and the mutation are applied simultaneously to the β variables and the missing values. The process of crossover and the mutation can also be applied non-simultaneously to the β variables and the missing values.

Referring generally to FIG. 7, an embodiment of a process of elitism is presented. In this embodiment, the solutions for models that have best fitness in a population or models are maintained. For example, the initial population 94 comprises "p" number of solutions, which are represented by $C_1^1$, $C_2^1$, $C_3^1$, etc. Considering the solution "$C_1^1$" has the best fitness, it is maintained in the second population produced after evolving the solutions of the first population. The initial population is evolved to a second population 96 comprising the same "p" number of solutions. The second population comprises solutions, $C_1^2$, $C_2^2$, $C_3^2$, ... $C_{p-1}^2$, $C_1^1$. Considering the solution "$C_2^2$" has the best fitness, it is maintained in the third population produced after evolving the solutions of the second population. The third population 98 comprises solutions $C_1^3$, $C_2^3$, $C_3^3$, ... $C_{p-2}^3$ $C_1^1$ and $C_2^2$. Therefore, the third population also comprises "p" number of solution. In one embodiment, only the top few solutions with fitness greater than the fitness of rest of the solutions are maintained. In another embodiment, all the solutions that have a fitness greater than a desired fitness are maintained.

As mentioned previously, the processors use the genetic algorithms to continue evolving successive populations until a stopping criterion is reached. Fitness of all solutions in each population is checked against a fitness function. The fitness of a solution is calculated by first inserting the missing values into the corresponding cells in the database. The propensity model, as shown in equation (3), is applied to arrive at predictions for each row. The fitness of the model output, f(X), with respect to the desired output variable, "y", is evaluated. The metric by which the fit of the model is calculated is the fitness function. The present technique is therefore applicable to predictive models built using missing data, and an appropriate metric is defined to evaluate how well the predictive model fits the data, regardless of the type of the predictive model, i.e., the specific functional form used in the model to define f(X) as well as the form of the output variable.

In one embodiment, the metric for a propensity model is the fitness function "L" presented in FIG. 8. The metric for a regression model can be the square of the correlation between f(X) and Y.

In the embodiment of the fitness function presented in FIG. 8, the value of "L" is calculated for a solution or a solution in a population by incorporating the estimated values of the "β's" and the missing values. The higher the values of L, the higher the fitness of a solution. Based on this, the fitness of each of the solutions is checked and the stopping criterion is applied. In one embodiment, the solutions are evolved until solutions of a predetermined fitness are achieved. In one embodiment, predetermined fitness may be a particular value of "L". A solution having a highest fitness among the solutions having the predetermined fitness is identified. The values for the "β's" and the missing values are decoded from the solution with the highest fitness.

In another embodiment, the solutions are evolved for a predetermined number of generations. A solution from a last population having highest fitness compared to other solutions in the last population is identified. The values for the "β's" and the missing values are calculated from the solution with the highest fitness In another embodiment, the solutions are evolved until there is no improvement in the fitness of the solutions through successive generations. A solution having highest fitness compared to other solutions in a last population is identified and the values for the "β's" and the missing values are estimated from that solution.

The various embodiments of a system and method for creating a predictive model with incomplete data described above thus provide a way to impute missing values while building the predictive model. The system and method thus eliminates a separate and exhaustive process for imputing the missing values before building the predictive model.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A computer implemented method, comprising:
using at least one processor for characterizing customer data and building a predictive model using a customer data set comprising customer characteristic data with at least one missing value for at least one customer characteristic, by performing steps comprising;
creating a population of solutions using a customer data set comprising missing values for one or more customer characteristics, wherein each solution comprises parameters of the predictive model and the missing values of the customer data set;
evolving the solutions in the population by modification of the parameters and the missing values to establish a successive population of the solutions; and
checking fitness of each of the solutions in the population and the successive population using a fitness function.

2. The method of claim 1, further comprising stopping evolving the solutions in a population after identifying the solutions having a predetermined fitness.

3. The method of claim 2, further comprising identifying a solution having a highest fitness among the predictive models having the predetermined fitness and getting the values for the parameters and the missing values from the predictive model having the highest fitness.

4. The method of claim 1, further comprising stopping evolving the solutions in a population after establishing a predetermined number of populations and identifying at least one solution having highest fitness compared to other solutions in a last population.

5. The method of claim 1, further comprising stopping evolving the solutions in a population until there is no improvement in the fitness of the predictive models through successive populations.

6. The method of claim 5, further comprising identifying at least one solution having highest fitness compared to other solutions in a last population and estimating the values for the parameters and the missing values from the at least one solution having the highest fitness.

7. The method of claim 1, wherein checking fitness of each of the solutions comprises measuring the fitness of the predictive model using the fitness function.

8. The method of claim 1, wherein the solutions in the population are evolved by simultaneously applying at least one genetic algorithm technique to the parameters of the predictive model and to the missing values.

9. The method of claim 1, wherein the solutions in the population are evolved by non-simultaneously applying at least one genetic algorithm technique to the parameters of the predictive model and to the missing values.

10. The method of claim 1, wherein the solutions in the population are genetically evolved using crossover, mutation and elitism operations.

11. The method of claim 1, wherein the predictive model comprises a propensity model.

12. The method of claim 1, wherein the predictive model comprises a regression model.

13. A system, comprising:
a processor configured to characterize customer data and build a predictive model by performing the steps of:
creating a population of solutions using a customer data set comprising customer characteristic data missing values for one or more customer characteristics, wherein each solution comprises parameters of the predictive model and the missing values of the customer data set;

evolving the solutions in the population by modification of the parameters and the missing values to establish a successive population of the solutions; and checking fitness of each of the solutions in the population and the successive population using a fitness function.

14. The system of claim 13, further comprising means for stopping evolving the solutions in a population after identifying the solutions having a predetermined fitness.

15. The system of claim 13, further comprising means for stopping evolving the solutions in a population after establishing a predetermined number of populations and identifying at least one solution having highest fitness compared to other solutions in a last population.

16. The system of claim 13, further comprising means for stopping evolving the solutions in a population until there is no improvement in the fitness of the solutions through successive populations.

17. The system of claim 13, wherein the solutions in the population are evolved by simultaneously applying at least one genetic algorithm technique to the parameters of the predictive model and to the missing values.

18. The system of claim 13, wherein the solutions in the population are evolved by non-simultaneously applying at least one genetic algorithm technique to the parameters of the predictive model and to the missing values.

19. The system of claim 13, wherein the predictive model comprises a propensity model.

20. A non-transitory machine-readable medium for characterizing customer data by developing a propensity model, comprising:

code operable to create a population of solutions using a customer data set comprising customer characterizing data missing values for one or more customer characteristics, wherein each solution comprises parameters of the propensity model and the missing values of the customer data set;

code operable to evolve the solutions in the population by modification of the parameters and the missing values to establish a successive population of the solutions; and code operable to check fitness of each of the solutions in the population and the successive population.

* * * * *